United States Patent

[11] 3,617,458

| [72] | Inventor | Francis Joseph Brockman |
| | | Mont-Saint-Hilaire, Canada |
| [21] | Appl. No. | 781,257 |
| [22] | Filed | Dec. 4, 1968 |
| [45] | Patented | Nov. 2, 1971 |
| [73] | Assignee | Canadian Industries Limited |
| | | Montreal, Quebec, Canada |
| [32] | Priority | Dec. 12, 1967 |
| [33] | | Great Britain |
| [31] | | 56,426/67 |

[54] CATIONIC ELECTRODEPOSITION SYSTEM
10 Claims, No Drawings

| [52] | U.S. Cl. | 204/181 |
| [51] | Int. Cl. | B01k 5/00, |
| | | C23b 13/00 |
| [50] | Field of Search | 204/181 |

[56] References Cited
UNITED STATES PATENTS

| 3,230,162 | 1/1966 | Gilchrist | 204/181 |
| 3,304,250 | 2/1967 | Gilchrist | 204/181 |
| 3,446,723 | 5/1969 | Pohlemann et al. | 204/181 |

*Primary Examiner*—Daniel E. Wyman
*Assistant Examiner*—W. J. Shine
*Attorney*—Cushman, Darby & Cushman ABSTRACT: A cross-linkable coating composition derived from an unsaturated compound containing a carboxylic acid group, an epoxidized material and a compound which contains a pendant amine group is dispersed in water by means of an acid such as phosphoric acid. The composition may be a blend of an epoxidized material with a copolymer having free carboxylic acid and amine groups, or a partially reacted precondensate thereof, or a condensate of a drying oil carboxylic acid, an epoxidized material and an amino acid. An article immersed in the dispersion as cathode is coated by electrodeposition and thereafter the coating cross linked by heating. The dispersion is replenished by a concentrate of coating composition.

CATIONIC ELECTRODEPOSITION SYSTEM

This invention relates to a composition suitable for cathodic coating of articles by electrodeposition and to a process for coating such articles.

It is known to deposit polymeric coatings on articles by electrodeposition from aqueous solutions or dispersions, employing the article as either the anode or cathode of an electrical circuit. In commercial practice anodic deposition is commonly employed. The polymer must contain ionic groups which enable the migration of the polymer under the influence of the electric field to the electrode to be coated. When an iron-containing article is coated employing anodic deposition there is a danger of contamination of the coating with iron dissolved from the anode during the passage of the electrical current. Thus from the point of view of avoidance of contamination the cathodic system has an advantage over the anodic system. However, in order to employ polymeric coating materials in a cathodic system it is necessary to provide polymer ionic groups which cause the polymer to migrate to the cathode of the electrodeposition apparatus, and on contact with the cathode deposit the polymer thereon. Since the deposited polymer must normally undergo a cross-linking reaction after deposition the polymer should contain both functional groups to permit transport and functional groups that take part in a cross-linking reaction.

A coating composition which has been found eminently suited to the formation of protective coatings on metals is that comprising a copolymer containing carboxylic acid groups and a material containing at least two epoxide groups per molecule. This composition is convertible to a protective coating by a cross-linking (or curing) reaction and the cross-linking reaction takes place in the presence of a basic catalyst such as an amine. The amine may be a functional group of the carboxylic acid-containing copolymer.

It has now been found that a coating composition suitable for cathodic deposition from aqueous dispersion can be derived from a mixture of compounds containing carboxylic acid groups, epoxide groups and pendant amine groups provided that free pendant amine groups are present to permit dispersion in water employing a proton-donating acid.

According to the present invention we provide an aqueous cross-linkable coating composition suitable for use in coating electrically conductive articles by electrodeposition which is derived from an unsaturated compound containing a carboxylic acid group, an epoxidised material and a compound containing a pendant amine group, there being present at least one epoxide group for each carboxylic acid group, the composition being dispersed in the aqueous phase by sufficient proton-donating acid to provide 0.5 to 1.0 equivalent of said acid for each amine group present.

When the composition is said to be dispersed in the aqueous phase we mean, for example, that there may apparently be true solution of the composition in the aqueous phase or the composition may be in colloidal dispersion or in the form of an emulsion.

Preferably the coating composition is a blend of a copolymer derived by copolymerization from a copolymerizable ethylenically unsaturated carboxylic acid and a copolymerizable ethylenically unsaturated monomer containing a pendant amine group and of an epoxidized material. More preferably the copolymer is also derived from a lower alkyl ester of an ehtylenically unsaturated carboxylic acid. However, the coating composition may be a precondensate in which the said copolymer and epoxidized material are partially interacted.

Alternatively, the composition may be derived from a drying oil fatty acid, an amino carboxylic acid and an epoxidized material, for example, a condensate of an epoxidized polybutadiene, soya fatty acid and N-coco-β-amino-butyric acid.

As components of the composition, suitable lower alkyl esters of ethylenically unsaturated carboxylic acids are ethyl acrylate, butyl acrylate, methyl methacrylate, ethyl methacrylate and butyl methacrylate. Suitable ethylenically unsaturated carboxylic acid ingredients are acrylic acid and methacrylic acid. Suitable drying oil fatty acids are cottonseed, corn, soya, oiticica, tung, linseed and perilla fatty acids. Suitable amino carboxylic acids are N-alkylamino acids such as those prepared from primary fatty amines and crotonic acid, for example, N-coco-β-amino-butyric acid. Amino acids containing secondary amino groups are preferred. Suitable ethylenically unsaturated amines are dimethylaminoehtyl methacrylate, diethylaminoethyl methacrylate, t-butylaminoethyl methacrylate and 4-vinylpyridine.

Suitable epoxidized materials are the compounds having the formula:

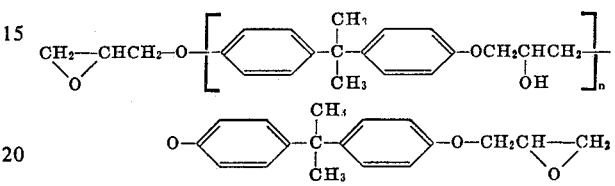

where $n$ is a generally less than 6 in the case of liquid epoxy resins and 2 or greater for solid resins. A preferred epoxidized material is represented by the formula above having $n = 0$ thus having a molecular weight of approximately 340. This material known commercially as "Epon" 828 is the condensation product of 2:2-di-p-hydroxy-phenyl propane and epichlorohydrin. Other suitable epoxidized materials are epoxidized polybutadienes and vinylcyclohexene diepoxide. Suitable epoxidized polybutadiene ingredients are those liquid polymeric materials having a molecular weight less than 1,500 with analytical values of: epoxide 9.0–11.1 percent, hydroxyl 2.0–2.5 percent and iodine value 154–185. These material contain both epoxide groups and double-bond unsaturation. The epoxide groups are both primary and secondary in configuration. These materials are known commercially by the trademark "Oxiron."

Suitable acids are the proton-donating acids such as phosphoric, sulfuric hydrochloric and acetic. The preferred acid is phosphoric, $H_3PO_4$.

In the preferred procedure of this invention the coating composition is prepared by first dissolving the amine, carboxylic acid group—containing polymer in a suitable solvent. A 2:1:2 isopropanol:isobutanol:2-butoxyethanol solution has been found satisfactory. To this solution is then added 0.5 to 1.0 molar equivalent of acid for each amine groups in the copolymer and the epoxidized material equivalent to the free carboxyl groups in the copolymer. Water is then added gradually with stirring to give a stable dispersion. The solids content of the coating composition may be as high as 25 percent, but preferably is in the range 5 percent to 10 percent.

When the coating composition is a condensate this is conveniently prepared by dissolving the drying oil carboxylic acid, epoxidized polybutadiene and amino acid in a solvent such as toluene and heating the mixed ingredients under reflux. In the preferred procedure for employing a condensate coating composition, the drying oil carboxylic acid/epoxidized polybutadiene/amino acid condensate is first dissolved in a suitable solvent. Toluene of 2:1:2 isopropanol:isobutanol:2-butoxyethanol solution has been found satisfactory. To this solution is then added 0.5 to 1.0 molar equivalent of proton-donating acid for each amino group in the condensate. Water is then added gradually with stirring to give a stable dispersion. The solids content of the coating composition may be as high as 25 percent.

The cross linking of the condensate coating composition is believed to take place through the unsaturated groups of the drying oil segments of the condensate.

According to a further feature of this invention we provide a process of coating an electrically conductive article by electrodeposition which comprises immersing the article in an aqueous dispersion of coating composition according to the invention and passing an electric current through the dispersion between the article as cathode and another electrode in electrical contact with the dispersion to cause deposition of a coating on the article removing the article from the dispersion and subsequently cross linking the coating by heating.

During electrodeposition of the coating voltages in the range of 12 to 300 volts can be employed. The voltage can be varied to suit the nature of the coating desired and in accordance with the disposition in the coating apparatus of the articles to be coated. It has been found desirable to apply the voltage to the articles before immersion in the coating bath in order to avoid solution of the substrate being coated. The articles, of course, form the cathode in the electric circuit of the electrodeposition system.

After removal from the coating bath the coated articles are cured by heating, for example, at 100° to 150° C. A suitable cure is obtained by heating for 30 minutes at 120° C.

It is of advantage to wash excess coating composition from the article prior to curing.

When pigmented coating compositions are required these can be prepared by two different procedures. The preferred procedure is to prepare a solution of the film-forming coating composition, acidify and disperse the pigment in the acidified solution. A dispersion of the pigmented composition is then formed by the addition of water. Alternatively, the acidified solution of film-forming coating composition can be mixed with water to form a dispersion of high-solids content. The pigment is then dispersed in the high-solids dispersion and additional water added to reduce the solids content of the dispersion to the desired level.

As the coating process proceeds the coating composition is deposited on the cathodic article and the aqueous dispersion must eventually be replenished with additional coating composition if deposition is to continue. According to a further feature of the invention we provide a replenishment concentrate suitable for use in the present process which comprises from 25–75 percent by weight based on the weight of the concentrate of a composition derived from an unsaturated compound containing a carboxylic acid group, an epoxidized material and a compound containing a pendant amine group, there being present sufficient epoxide groups to provide at least one epoxide group for each carboxylic acid group, the composition being dispersed in organic liquid and optionally water together with from 0 –1.0 equivalents of proton-donating acid for each amine group present.

Thus, for example, the coating composition may be dispersed in the concentrate in organic solvent in the absence of water, with or without proton-donating acid, or in a mixture of organic solvent and water, with or without proton-donating acid. Examples of suitable organic solvents include butanol, isopropanol, isobutanol and methyl cellosolve.

As coating proceeds and coating composition is deposited onto cathodic articles there is an accumulation of acid and an undesirable fall in pH of the composition which may lead to a slowing up and eventual cessation of the deposition process. This accumulation may be balanced, so that the pH of the composition remains substantially within desirable limits by the addition of a replenishment concentrate which contains less proton-donating acid than did the initial coating composition. A desirable range of pH within which the compensation should be maintained for satisfactory operation is 3–7.

Alternatively, the pH of the dispersion may be maintained within desirable limits by the selective removal of accumulated acid through an ion-exchange membrane as described in British Pat. No. 1,106,979.

The coatings provided by this invention are hard and flexible. They are suitable as coatings for appliances and automotive bodies.

The invention is further illustrated by the following examples.

EXAMPLE 1

A copolymer of ethyl acrylate/acrylic acid/dimethylaminoethyl methacrylate 85/10/5 was prepared employing the following ingredients:

| | |
|---|---|
| Ethyl acrylate (redistilled) | 127.5 grams |
| Acrylic acid | 15.0 grams |
| Dimethylaminoethyl methacrylate (redistilled) | 7.5 grams |
| Toluene | 75.0 grams |
| Isopropanol | 7.50 grams |
| Azodiisobutyronitrile catalyst | 3.0 grams |

The preparation was carried out in a three-necked flask equipped with a stirrer, reflux condenser, thermometer, additional funnel and nitrogen inlet tube. One-third of the reactants were added to the flask initially, and the flask was flushed with nitrogen. The flask was then carefully heated to 60° C. to initiate polymerization and maintained as close to this temperature as possible by means of external cooling. After the initial polymerization had begun to subside, the remaining portion of the reactants was then added in 25 cc. increments during a period of 100 minutes so as not to reduce the viscosity appreciably on addition. The temperature was maintained at 58°–62° C. during addition. The polymer solution was maintained at 60° C. with stirring for an additional 24 hours. At this time the solvent and other volatiles were distilled from the polymer solution under partial vacuum on the steam bath and the residue taken up in a solution of 50 grams 2-butoxyethanol, 25 grams isobutanol and 50 grams isopropanol. The solids content of the resulting solution was 53.7 percent and conversion during polymerization was 97 percent.

To 100 grams of the above copolymer solution (0.0176 equivalent amine, 0.0765 equivalent free carboxylic acid) in a 1-liter flask were added with stirring 1.01 cc. 85 percent phosphoric acid (0.0160 mole) and 12.6 grams (0.072 equivalent) of "Epon" 828. "Epon" 828 is a resinous condensate of 2:2-di-p-hydroxyphenyl propane and epichlorohydrin having an effective molecular weight of about 350. A paddle-type stirrer was used for stirring. When solution was complete 400 cc. of water were added dropwise over a period of 45 minutes. A stable dispersion resulted.

A test panel of 2×6 inches bonderized steel was coated cathodically using the above dispersion. The electrodeposition bath employed was a 250 cc. beaker of 2½ inches inside diameter. The electrodes, consisting of the metal test panel and a 2×6 inches platinum sheet anode, were positioned in place by inserting them through parallel slots separated by 1-inch spacing in an asbestos cover. The beaker was filled to a depth of 2½ inches with the emulsion (ca. 190 cc.). The power source was a series of 12-volt storage batteries giving voltage increments in 12-volt units. The voltage potential was applied to the electrodes prior to immersion in the bath. Electrodeposition was carried out at a voltage of 36 volts for 2 minutes. After washing off the excess composition with water the coating was cured at 120° C. for 30 minutes. A hard, flexible coating resulted

EXAMPLE 2

The coulomb yield of the coating composition of example 1 when electrodeposited on a number of substrates was determined. The test panels were 4×6 inches, the anode being a 2×6 inches platinum sheet positioned 5 inches from the test panel. The voltage potential was applied to the electrodes before the panel was immersed in the bath. The 85/10/5 weight percent copolymer of ethyl acrylate/acrylic acid/dimethylaminoethyl methacrylate was tested in three different solvent systems forming three aqueous dispersion systems. The copolymer solutions were as follows:

A. 50 percent solution in 2:1:2-isopropanol:isobutanol:2-butoxyethanol.

B. 60 percent solution in 2:1:2-isopropanol:isobutanol:2-butoxyethanol.

C. 60 percent solution in 2:1-isobutanol:isopropanol.

To the copolymer solutions were added phosphoric acid equivalent to the copolymer amine groups and the polyepoxide equivalent to the copolymer carboxylic acid groups. The polyepoxide was a resinous condensate of 2:2-di-p-hydroxyphenol propane and epichlorohydrin having an effective molecular weight of about 350. When solution was complete sufficient water was added to form a dispersion having a solids content of 5 percent. The aqueous dispersion was then electrodeposited on the substrate during a 2-minute period. The excess dispersion was washed off with water and the coating was cured by baking for 30 minutes at 120° C. The coulomb yields in grams per coulomb are shown in table 1. The voltage employed during electrodeposition are shown.

TABLE I

| Substrate | Dispersion A 48 volts/ 2 min. | Dispersion A 60 volts/ 2 min. | Dispersion B, 60 volts/ 2 min. | Dispersion C, 36 volts/ 2 min. |
|---|---|---|---|---|
| Bare steel | 0.0215 | 0.0218 | | 0.0194 |
| Zinc phosphate-treated steel (Granodine 23) | 0.0196 | 0.0207 | | |
| Zinc phosphate-treated steel (Granodine 164) | | | 0.0214 | 0.0207 |
| Zinc phosphate-treated steel (Granodine 80) | | | 0.0202 | 0.0197 |
| Iron phosphate-treated steel (Granodine 1103) | 0.0201 | 0.0203 | 0.0206 | 0.0204 |
| Iron phosphate-treated steel (Bonderite 37) | 0.0193 | 0.0192 | | |
| Iron phosphate-treated steel (Bonderite 1000) | | | 0.0215 | 0.0205 |
| Zinc electrolytically deposited on steel (Zintite) | 0.0186 | | | |
| Chromate treated aluminium (Alocrom 100) | 0.0193 | 0.0192 | | |

EXAMPLE 3

The coulomb yields of titanium dioxide pigmented coating compositions analogous to the unpigmented system of example 1 were determined. The ethyl acrylate/acrylic acid/dimethylaminoethyl methacrylate copolymer-polyepoxide blend was pigmented by two procedures.

The first procedure comprised pigmenting the blend (after treatment with phosphoric acid) in organic solution and subsequently dispersing the pigmented resin by addition of water. The pigment/binder ratio was 1:2.5. The addition of a small amount (3.7 percent) of toluene to the pigmented composition was found to improve its transport characteristics. Replacement of the toluene with isopropanol on the other hand impaired the transport characteristics.

The second procedure comprised adding sufficient water to the acidified copolymer-epoxide blend in organic solution to form a dispersion of high-solids content. This dispersion was then pigmented with titanium dioxide and subsequently further diluted with water.

The test panels were coated by electrodeposition employing the apparatus of example 2. The aqueous dispersions were not stirred during electrodeposition. The coulomb yields in grams per coulomb are shown in table II.

EXAMPLE 4

Employing the copolymerization procedure of example 1 a copolymer of 85/10/5-ethyl acrylate/acrylic acid/t-butylamino-ethyl methacrylate was prepared in 2:1:2 isopropanol:isobutanol:FQ—BUTOXYETHANOL SOLUTIO azodiisobutyronitrile catalyst. This was blended with polyepoxide ("Epon" 828) in amount equivalent to the carboxylic acid groups of the copolymer and acidified with phosphoric acid in amount equivalent to the amine groups. A dispersion was prepared by adding water to give a 5 percent solids content and a pH of 2.8.

The aqueous dispersion was electrodeposited on 4×6 inches bonderized steel panel employing the apparatus of example 2 at 48 volts for 2 minutes. The coated panel was washed with water and cured by heating at 120°–150° C. for 30 minutes.

The coating had satisfactory film properties and corrosion resistance.

EXAMPLE 5

A coating composition was prepared employing vinyl-cyclohexene diepoxide as the polyepoxide ingredient. The copolymer of example 1, 85/10/5 ethyl acrylate/acrylic acid/dimethylaminoethyl methacrylate dissolved in 6:6:1 isopropanol:isobutanol toluene was reacted with 1 mole of phosphoric acid per amine equivalent of the copolymer. Vinylcyclohexene diepoxide was then heated with the solution of the acidified copolymer in proportion of one equivalent of epoxide per equivalent of carboxyl in the copolymer. After completion of the partial interaction reaction, the system was dispersed by the addition of water to give 9 percent solids. Films were deposited by cathodic electrodeposition employing the apparatus of example 2 at 48-volts potential for a period of 2 minutes. On curing at 150° C. for 30 minutes films with good gloss and appearance were obtained. The dispersion exhibited chemical stability in excess of 6 months.

EXAMPLE 6

A condensate was prepared by the interaction of 100 g. (0.55 equivalent) of an epoxidized polybutadiene having an

TABLE II

| | Pigmented in organic solvents | | | | | Pigmented as a dispersion | | |
|---|---|---|---|---|---|---|---|---|
| | Toluene added | | | Isopropanol added | | | | |
| Substrate | 36 volts/ 2 min. | 48 volts/ 2 min. | 60 volts/ 2 min. | 48 volts/ 2 min. | 60 volts/ 2 min. | 36 volts/ 2 min. | 48 volts/ 2 min. | 60 volts/ 2 min. |
| Bare steel | | 0.620 | 0.0634 | | 0.0651 | | 0.0380 | |
| Zinc phosphate treated steel (Granodine 23) | 0.0532 | 0.0587 | 0.0606 | 0.0625 | | 0.0293 | 0.0393 | 0.0385 |
| Iron phosphate treated steel (Granodine 1103) | | | | 0.0630 | 0.0658 | | | |
| Iron phosphate treated steel (Bonderite 37) | | | | 0.0607 | | | | 0.0390 |
| Zinc electrolytically deposited on steel (Zintite) | | | 0.0615 | | | | | |
| Aluminium | | | | 0.0630 | | | | |
| Chromate treated steel (Alocrom 100) | | | | 0.0590 | 0.0623 | | | 0.0387 | epoxy equivalent of 177, a hydroxyl percentage of 2.5 and an iodine number of 185 ("Oxiron" 2000), 57 g. (0.20 equivalent) of soya fatty acid and 32.4 g. (0.06 equivalent) of N-coco-β-amino-butyric acid ("Armeen" Z). The reaction was carried out by heating for 1 hour at 105°-150° C. in 100 g. toluene. The resulting condensate was acidified with 3.8 ml. 85 percent phosphoric acid (1 mole per quivalent of amine) and dispersed by the addition of sufficient water to give an aqueous dispersion of 23 percent solids.

A test panel of 2×6 inches bonderized steel was coated cathodically using the above dispersion. The electrodeposition bath employed was a 250 cc. beaker of 2½ inches inside diameter. The electrodes, consisting of the metal test panel and a 2×6 inches platinum sheet anode, were positioned in place by inserting them through parallel slots separated by 1 inch spacing in an asbestos cover. The beaker was filled to a depth of 2½ inches with the dispersion. The power source was a series of 12-volt storage batteries giving voltage increments in 12-volt units. The voltage potention was applied to the electrodes prior to immersion in the bath. Electrodeposition was carried out at a voltage of 24 volts for a period of 2 minutes. The coulomb yield was 0.0153 g./coulomb. After baking at 120° C. for 30 minutes, films of reasonable cure and appearance were obtained.

EXAMPLE 7

A solution composed of 75 g. ethyl acrylate, 10 g. butyl acrylate, 10 g. acrylic acid, 5 g. 4-vinylpyridine, 80 g. toluene and 20 g. butanol and 2 g. azodiisobutyronitrile was placed in a 1-liter three-necked flask equipped with a stirrer, a thermometer, a reflux condenser and an addition funnel. The reaction setup was then rinsed with nitrogen and heated to bring the temperature of the contents to 60°-65° C. After 3 hours when the reaction solution had thickened considerably, a solution of 75 g. ethyl acrylate, 10 butyl acrylate, 10 g. acrylic acid and 5 g. 4-vinylpyridine, 20 g. isopropanol and 2 g. azodiisobutyronitrile was added over a 5-hour period. The reaction solution was then maintained for a further 7 hours at 60° C. At the end of this period the volatiles were removed under reduced pressure and the residue taken up in a solution of 100 g. 2-butoxyethanol, 50 g. isobutanol and 200 g. isopropanol.

A quantity of 100 g. of the above polymer solution in admixture with 1.13 ml. 85 percent phosphoric acid (1 molar proportion per equivalent amine in copolymer) and 8.15 g. "Epon" 828 (1 equivalent per equivalent carboxyl in copolymer) was dispersed by the addition of 400 ml. of water with stirring. Films were obtained from this dispersion at the cathode (bonderized steel) on electrodeposition at 40 and 60 volts for 2-minute periods. These films were not removed on washing with water and were rendered solvent resistant on baking at 120° C. for 30 minutes.

EXAMPLE 8

A 100 g. quantity of 56 percent of solution of 85/10/5 ethyl acrylate/acrylic acid/dimethylaminoethyl methacrylate copolymer in 6:6:1-isopropanol:isobutanol:toluene was partially reacted with 5.45 g. vinylcyclohexene diepoxide (one equivalent epoxide per carboxyl in copolymer) by heating to 95° C. in the presence of 1.14 ml. 85 percent phosphoric acid (one mole per equivalent of amine in copolymer). To resulting solution was added 600 ml. water with stirring over a 30-minute period giving a dispersion of 9 percent solids. Films were prepared by cathodic electrodeposition at 24-, 36- and 48-volts potential for periods of 2 minutes. On curing at 150° C. for 30 minutes films of good gloss and appearance were obtained. The dispersion exhibited chemical stability in excess of 6 months.

What I claim is:

1. A process of coating an electrically conductive article by electrodeposition which comprises immersing the article in an aqueous coating composition and passing an electric current through the composition between the article as cathode and another electrode in electrical contact with the composition to cause deposition of a coating on the article, removing the article from the dispersion and subsequently cross linking the coating by heating, said composition comprising a member of the group consisting of (A) blends of (1) a copolymer of an alkenoic monocarboxylic acid and an alkylaminoalkyl monoalkenoate or vinyl pyridine, (2) and epoxidized material selected from the group consisting of compounds having the formula:

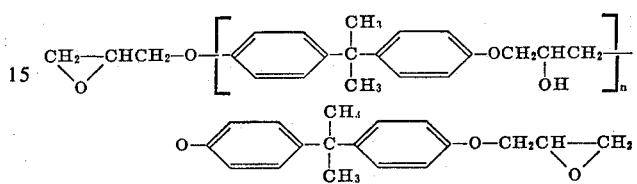

where n is an integer, epoxidized polybutadiene and vinylchclohexene diepoxide, there being present in the composition at least one epoxide group for each carboxylic acid group, and (3) proton-donating acid in an amount sufficient to provide 0.5 to 1.0 equivalents of said acid for each amine group present, and (B) precondensates obtained from said blend by partial reaction between said copolymer and said epoxidized material.

2. A process according to claim 1 wherein alkylaminoalkyl monoalkenoate is a dialkylaminoethyl methacrylate.

3. A process according to claim 1 wherein the epoxidized material is a condensation product of epichlorhydrin and 2:2-di-p-hydroxyphenol propane.

4. A process according to claim 1 wherein the copolymer and the epoxidized material are partially interacted.

5. A process according to claim 1 wherein the epoxidized material is epoxidized polybutadiene.

6. A process according to claim 1 wherein the proton-donating acid is phosphoric acid.

7. A process according to claim 1 wherein the coating composition is dissolved in organic solvent prior to dispersion in water.

8. A process according to claim 1 wherein the article is cured at a temperature in the range 100°-150° C.

9. A process according to claim 1 wherein the electric current has a voltage in the range 12-300 volts.

10. A process of coating an electrically conductive article by electrodeposition which comprises immersing the article in an aqueous coating composition and passing an electric current through the composition between the article as cathode and another electrode in electrical contact with the composition, characterized in that the composition comprises a member of the group consisting of (A) a blend of (1) a copolymer of an alkenoic monocarboxylic acid and an alkylaminoalkyl monoalkenoate or vinyl pyridine, (2) an epoxidized material selected from the group consisting of compounds having the formula:

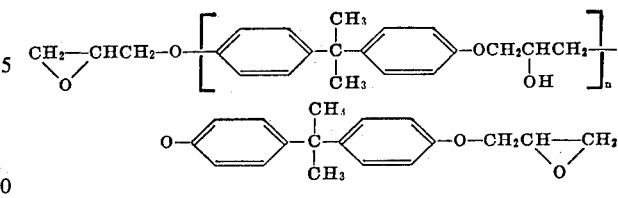

where n is an integer, epoxidized polybutadiene and vinylcyclohexene diepoxide, there being present in the composition at least one epoxide group for each carboxylic acid group, and (3) proton-donating acid in an amount sufficient to provide 0.5 to 1.0 equivalents of said acid for each amine group present and (B) precondensates obtained from said blend by partial reaction between said copolymer and said epoxidized material.

* * * * *